United States Patent
Neuner, III et al.

(10) Patent No.: US 9,948,395 B2
(45) Date of Patent: Apr. 17, 2018

(54) SYSTEM AND METHOD FOR LINE-OF-SIGHT OPTICAL BROADCASTING USING BEAM DIVERGENCE AND AN ORBITING OR AIRBORNE CORNER CUBE REFLECTOR

(71) Applicant: The United States of America as represented by the Secretary of the Navy, Washington, DC (US)

(72) Inventors: Burton H. Neuner, III, San Diego, CA (US); Paul D. Swanson, Santee, CA (US); David T. Wayne, San Diego, CA (US); John S. deGrassie, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 15/262,200

(22) Filed: Sep. 12, 2016

(65) Prior Publication Data
US 2018/0076894 A1 Mar. 15, 2018

(51) Int. Cl.
*H04B 10/00* (2013.01)
*H04B 10/118* (2013.01)
*H04B 10/112* (2013.01)

(52) U.S. Cl.
CPC ....... *H04B 10/118* (2013.01); *H04B 10/1129* (2013.01)

(58) Field of Classification Search
CPC .... H04B 10/118; H04B 10/1127; H04B 10/11
USPC .......... 375/219–222, 354–356, 295
See application file for complete search history.

(56) References Cited

U.S. PATENT DOCUMENTS

| 4,361,911 | A | * | 11/1982 | Buser | G01S 17/74 342/45 |
| 4,669,682 | A | * | 6/1987 | Diehl | F41G 7/26 244/3.13 |
| 4,676,455 | A | * | 6/1987 | Diehl | F41G 7/263 244/3.13 |
| H0299 | H | * | 7/1987 | Miller, Jr. | 244/3.13 |

(Continued)

OTHER PUBLICATIONS

J. Degnan, Contributions of Space Geodesy to Geodynamics: Technology, pp. 133-162 (1993).

(Continued)

*Primary Examiner* — Emmanuel Bayard
(74) *Attorney, Agent, or Firm* — SPAWAR Systems Center Pacific; Kyle Eppele; Susanna J. Torke (57) ABSTRACT

A system comprises a tracking electromagnetic beam generator, a retro-reflecting device, a signal generator, a communication electromagnetic beam generator and a receiver. The tracking electromagnetic beam generator transmits a tracking electromagnetic beam. The retro-reflecting device reflects the tracking electromagnetic beam toward the tracking electromagnetic beam generator. The signal generator generates a communication signal. The communication electromagnetic beam generator transmits a communication electromagnetic beam, based on the communication signal, to the retro-reflecting device. The receiver receives a portion of the communication electromagnetic beam as reflected from the retro-reflecting device.

20 Claims, 8 Drawing Sheets

(56) References Cited

U.S. PATENT DOCUMENTS

| | | | | |
|---|---|---|---|---|
| 4,714,339 | A | * | 12/1987 | Lau .................. B25J 13/089 356/139.08 |
| 4,777,660 | A | | 10/1988 | Gould et al. |
| 5,393,967 | A | * | 2/1995 | Rice .................. G06K 7/10594 235/440 |
| 5,659,413 | A | * | 8/1997 | Carlson .............. H04B 10/118 398/119 |
| 5,918,305 | A | * | 6/1999 | Livingston ............ G01S 17/46 89/1.11 |
| 5,949,594 | A | | 9/1999 | Iglseder et al. |
| 5,977,871 | A | * | 11/1999 | Miller .................. G08B 29/22 340/502 |
| 6,091,528 | A | * | 7/2000 | Kanda ................ H04B 10/118 398/1 |
| 6,804,422 | B1 | * | 10/2004 | Bajorins ................ G02B 6/32 359/407 |
| 8,224,189 | B1 | | 7/2012 | Frolov |
| 8,648,914 | B1 | * | 2/2014 | Winker .................... F41G 3/02 244/3.16 |
| 9,377,885 | B2 | | 6/2016 | Bridges et al. |
| 2002/0131121 | A1 | * | 9/2002 | Jeganathan ........ H04B 10/1127 398/128 |
| 2003/0095302 | A1 | * | 5/2003 | Schuster ............ H04B 10/1121 398/164 |
| 2005/0180753 | A1 | * | 8/2005 | Wirth .................... G02B 26/06 398/118 |
| 2006/0024061 | A1 | * | 2/2006 | Wirth .................. H04B 10/1125 398/129 |
| 2009/0097378 | A1 | * | 4/2009 | Oder .................. H04B 10/1149 369/103 |
| 2010/0282941 | A1 | * | 11/2010 | Mosier .................... G01S 17/66 250/203.1 |
| 2011/0032509 | A1 | * | 2/2011 | Bridges ................ G01S 7/4818 356/5.13 |
| 2012/0262550 | A1 | * | 10/2012 | Bridges ................ G01C 15/002 348/46 |
| 2013/0176570 | A1 | * | 7/2013 | Beck .................... G01N 21/314 356/433 |
| 2013/0238279 | A1 | * | 9/2013 | Schmier, II ............... G01S 7/40 702/150 |
| 2013/0241761 | A1 | * | 9/2013 | Cooper .................. G01S 7/4812 342/54 |
| 2014/0373369 | A1 | * | 12/2014 | Bockem ............... G01C 15/002 33/228 |
| 2015/0009485 | A1 | * | 1/2015 | Mheen .................... G01S 17/87 356/4.01 |
| 2015/0185324 | A1 | * | 7/2015 | Cooper .................. G01S 17/66 356/4.01 |
| 2016/0209496 | A1 | * | 7/2016 | Smith .................... G01S 17/42 |

OTHER PUBLICATIONS

H.J. Kramer, Observation of the Earth and Its Environment, Springer-Verlag, Berlin (2002).

* cited by examiner

| Parameter | Large CCR in LEO | Arrayed small CCRs in LEO | Comments |
|---|---|---|---|
| Transmit (Tx) power (W) | 100 | 100 | This is 0.1 kW |
| Full divergence (radians) | 0.00005 | 0.00005 | 50 microradian source |
| Range (m) | 500000 | 500000 | This is a 500-km orbit |
| Wavelength (m) | 1.55E-06 | 0.00000155 | 1550 nm |
| Retroreflector diameter (m) | 0.02 | 0.0001 | 20 cm; 0.1 mm |
| Receiver diameter (m) | 0.5 | 0.5 | Half-meter-wide receiver |
| Tx gain | 1.280E+10 | 1.280E+10 | |
| Range loss | 6.086E-26 | 6.086E-26 | Tx path |
| Retroreflector gain | 2.700E+18 | 1.688E+09 | |
| Range loss | 6.086E-26 | 6.086E-26 | Rx path |
| Receiver gain | 1.027E+12 | 1.027E+12 | |
| Reflection loss | 8.493E-01 | 8.493E-01 | |
| Array gain | 1 | 40000 | Array of 0.1-mm CRRs |
| TOTAL LOSS | 1.117E-10 | 2.791E-15 | |
| Received power (W) | 1.117E-08 | 2.791E-13 | |
| Received power (dBm) | -49.52 | -95.54 | Realistic 2013 detector sensitivity is -52 dBm |
| CCR divergence (radians) | 7.750E-05 | 1.550E-02 | |
| Broadcasted ground spot (m) | 38.8 | 7750.0 | Diameter in meters |

| Total atmospheric loss ("average" weather days) | |
|---|---|
| Kandahar Airport | 2.4 dB loss |
| Sahara Desert | 3.5 dB loss |
| Naha Airport | 3.8 dB loss |
| Eastern Pacific Ocean | 4.5 dB loss |
| Arctic Ocean | 8.0 dB loss |

SYSTEM AND METHOD FOR LINE-OF-SIGHT OPTICAL BROADCASTING USING BEAM DIVERGENCE AND AN ORBITING OR AIRBORNE CORNER CUBE REFLECTOR

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619)553-5118; email: ssc_pac_t2@navy.mil. Reference Navy Case No. 102,427.

BACKGROUND OF THE INVENTION

Embodiments of the invention relate to line of sight communications.

SUMMARY OF THE INVENTION

An aspect of the present invention is drawn to a system comprising a tracking electromagnetic beam generator, a retro-reflecting device, a signal generator, a communication electromagnetic beam generator and a receiver. The tracking electromagnetic beam generator transmits a tracking electromagnetic beam. The retro-reflecting device reflects the tracking electromagnetic beam toward the tracking electromagnetic beam generator. The signal generator generates a communication signal. The communication electromagnetic beam generator transmits a communication electromagnetic beam, based on the communication signal, to the retro-reflecting device. The receiver receives a portion of the communication electromagnetic beam as reflected from the retro-reflecting device.

BRIEF DESCRIPTION OF THE DRAWINGS

The accompanying drawings, which are incorporated in and form a part of the specification, illustrate example embodiments and, together with the description, serve to explain the principles of the invention. In the drawings.

DETAILED DESCRIPTION OF THE EMBODIMENTS

A purpose of the present invention is to provide an effective low-cost manner of broadcasting data or communications using the optical (visible and infrared) spectrum. A laser directs high-data-rate optical power toward a passive retroreflector device in low-Earth orbit or attached to an airborne vehicle kilometers above the ground. The laser light is reflected back to Earth with a large spot size, on the order of hundreds of meters to kilometers in diameter. The optical broadcast is only received in a predetermined area around the transmitter, and the signal is very difficult to jam, providing overt, jam-free communications that are important to military applications.

While optical communications are limited to line-of-sight connections, they are much harder to jam than radio frequency (RF) transmission, which provides the majority of commercial and military wireless communications. Unlike the RF band, the optical spectrum is not governed by international agreements on frequency and bandwidth usage, so the optical signal can be chosen and used as dictated by the application. Furthermore, because the optical spectrum exists at much higher frequencies than the RF spectrum, much higher data rates are supported.

Directly broadcasting from space-based orbits or multi-kilometer-high airborne platforms using the optical spectrum would require expensive and power-intensive onboard laser transmitters, and would not allow real-time, ground-based data updates. An inexpensive, passive retroreflector in orbit or attached to a vehicle aloft, however, would simply reflect transmission from a ground-based telescope. The retroreflecting material would be largely frequency insensitive, enabling the use of the entire optical spectrum with similar results. This insensitivity permits real-time frequency channel changes, a feature not possible with dedicated onboard transmitters. A result of its passive nature, the retroreflector can also support multiple broadcasts from any direction, limited only by the physical durability of the material (extreme optical irradiation exceeding kilowatts could result in warping or melting of certain components).

Lastly, by retaining the expensive, vulnerable, and maintenance-demanding components on the ground, passive optical broadcasting provides added physical security and repair flexibility to the transmitter, features not possible with active orbiting or airborne RF or optical transmitters.

In an example embodiment, the transmitter includes a high-power, modulatable laser located on the surface of the Earth, which is collimated and focused by a telescope or similar optical system, and is directed to the retroreflector by a gimbal mount for pointing and tracking (this system, with support electronics and laser sources, comprises the transmitter). The continuous wave laser power may range from watts to kilowatts. A pulsed laser with substantially larger peak powers can also be used. For initial tracking purposes, a higher-divergence laser will be employed to illuminate a large area when the exact retroreflector location is unknown. Once the retroreflector location is determined via the tracking signal, the system will lock onto the correct location and the communication laser will operate.

The optical communication transmitter will employ a very-low-divergence laser, with a wavelength matched to minimal atmospheric absorption in the band of interest. Example wavelengths of interest include the band surrounding 1550 nm, which transmits in atmosphere, and has a large technical base resulting from decades of optical fiber telecommunication progress. The mid-IR atmospheric windows (e.g., near both 3 micrometers and 10 micrometers) may also be of interest. Blue-green lasers in the visible band of 400-550 nm may be employed as well, as that band is of interest for undersea communication applications. Multiple laser sources (within the same or different bands) directed at the same satellite or airborne retroreflector could enable a wavelength-multiplexed network, i.e., multiple data streams transmitted along the same optical path, for increased data communication. Possible methods to encode data within the laser transmitter include modulating frequency or intensity.

In an example embodiment, the orbiting or airborne 8-sided corner cube retroreflectors (CCRs) should be large enough to reflect most or all of a transmitted beam, and the optical receiver(s) should be able to receive the optical signal, which will be dramatically lower in power because the beam has been broadcast to a spot size exceeding approximately one kilometer. Optical divergence by the retroreflector, which controls the broadcast pattern, is desired, and can be designed through engineering. Increased divergence can be accomplished in any known manner, non-limiting examples of which include the following: misaligning or "spoiling" the 3-mirror retroreflector alignment, fabricating corrugations or flat Fresnel lenses on the mirror surfaces that defocus the beam, and using a large array of much smaller retroreflectors that inherently possess greater divergence resulting from their small-aperture diffraction. The retroreflector devices can be launched into low Earth orbit, or can be carried on airborne vehicles that are either manned (planes, helicopters, etc.) or unmanned (autonomous balloons, blimps, unmanned aerial vehicles (UAVs), etc.).

Aspects of the present invention will now be further described with reference to FIGS. 1-10.

Figure 1:
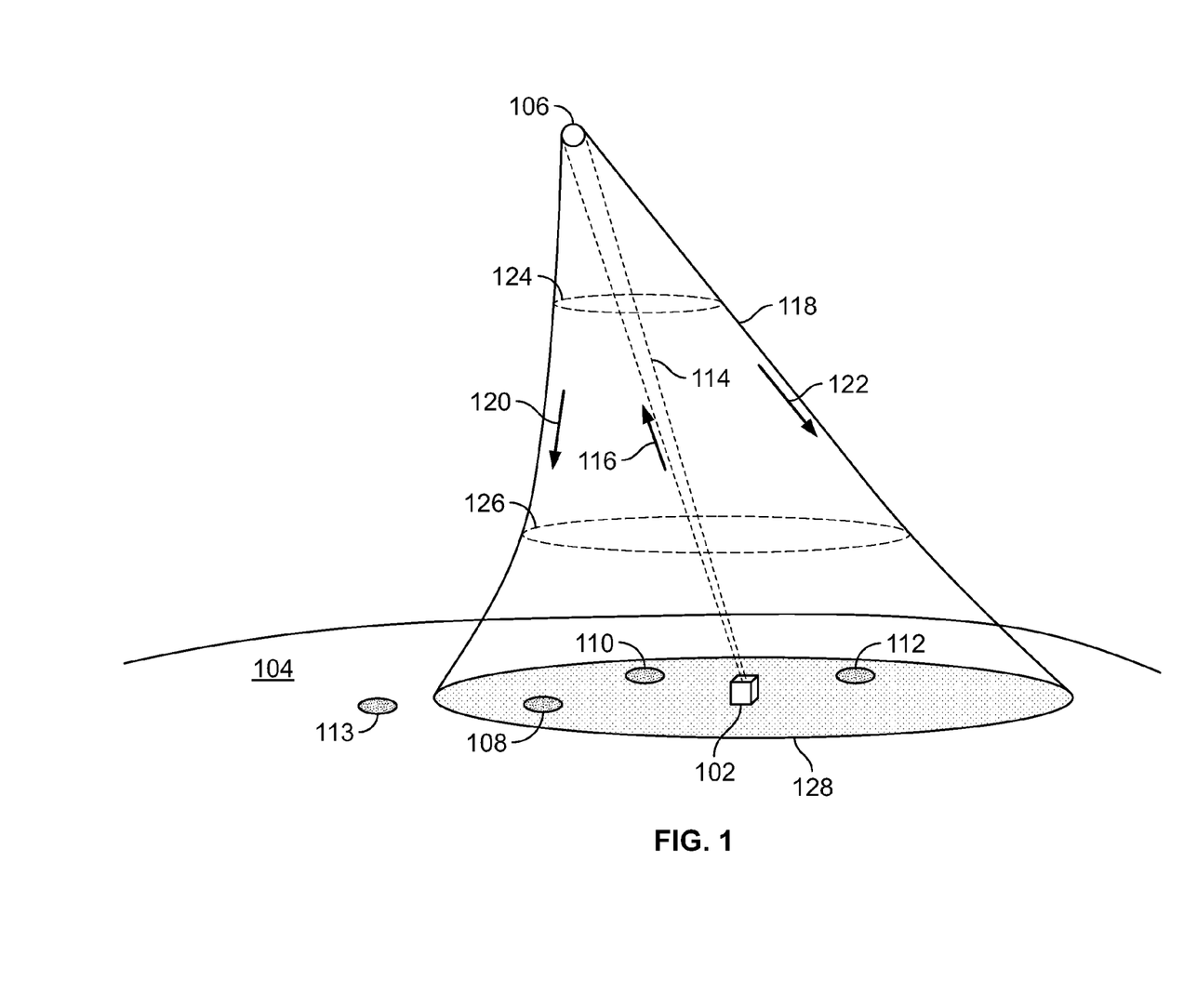
FIG. 1 illustrates a line-of-sight electromagnetic beam broadcasting system in accordance with aspects of the present invention.

FIG. 1 illustrates a line-of-sight electromagnetic beam broadcasting system in accordance with aspects of the present invention.

As shown in the figure, an electromagnetic beam broadcasting station 102 is positioned on the surface of ground 104, whereas a retroreflecting device 106 is positioned above ground 104. Receiving stations 108, 110 and 112 are disposed on ground 104, near electromagnetic beam broadcasting station 102. Receiving station 113 is disposed on ground 104, but at a much farther distance from electromagnetic beam broadcasting station 102 as compared to receiving stations 108, 110 and 112.

Electromagnetic beam broadcasting station 102 transmits a divergent electromagnetic beam 114 in a direction indicated by arrow 116 toward retroreflecting device 106. Electromagnetic beam broadcasting station 102 may be any device or system that is able to transmit a beam within the electromagnetic spectrum, wherein the beam carries information for communication to a receiver (or receivers). In non-limiting example embodiments described herein, the electromagnetic beam is a laser beam operating in the optical spectrum, including the band of 200 nm-10600 nm. In other non-limiting example embodiments, the electromagnetic beam is a laser beam operating in the ultra-violet spectrum, including 1550 nm. In other non-limiting example embodiments, the electromagnetic beam is a laser beam operating in the infra-red spectrum.

Retroreflecting device 106 may be any known device or system that reflects divergent electromagnetic beam 114 as a reflected divergent electromagnetic beam 118 in a direction indicated by arrows 122 and 120 toward electromagnetic beam broadcasting station 102. In a non-limiting example embodiment, a corner cube reflector (CCR) is used as a retroreflecting device. Other non-limiting examples include, corner cube reflecting arrays, diffraction gratings, flat mirrors, curved mirrors, multilayered spherical ball retroreflector and mirror arrays. Further, some embodiments use optical systems as retroreflecting device 106, wherein non-limiting examples of such optical systems include combinations of lenses, diffraction gratings, Fresnel lenses, corner cube reflecting arrays, flat mirrors, curved mirrors and mirror arrays. Still further, some embodiments use optical systems as retroreflecting device 106 that compensate for spherical and chromatic aberrations.

The cross-sectional beam area of reflected divergent electromagnetic beam 118 increases as a function of distance from retroreflecting device 106 as a result of dispersion. This increased cross-sectional beam area is illustrated by area 124, area 126, which is larger than area 124, and finally by area 128, which is even larger than area 126 and which is on the surface of ground 104. Further, it should be noted that some embodiments use optical systems as retroreflecting device 106 that modifies the dispersion of reflected divergent electromagnetic beam 118 to vary the size of area 128.

For purposes of discussion, let electromagnetic beam broadcasting station 102 be operated by a user that wishes to communicate with users associated with each of receiving stations 108, 110 and 112. For example, in a military application, let the user of electromagnetic beam broadcasting station 102 and the users associated with each of receiving stations 108, 110 and 112 be in the same ground unit. Further, suppose the user of electromagnetic beam broadcasting station 102 does not wish to communicate with a user associated with receiving station 113. For example, let the user associated with receiving station 113 be an enemy ground unit. In accordance with aspects of the present invention, electromagnetic beam broadcasting station 102 can communicate with each of receiving stations 108, 110 and 112, as they lie within area 128. Conversely, receiving station 113 cannot intercept the communication from electromagnetic beam broadcasting station 113, as it lies outside of area 128.

In some embodiments, retroreflecting device 106 may be geosynchronous with the Earth. In other embodiments, retroreflecting device 106 may move relative to the Earth.

Figure 2A:
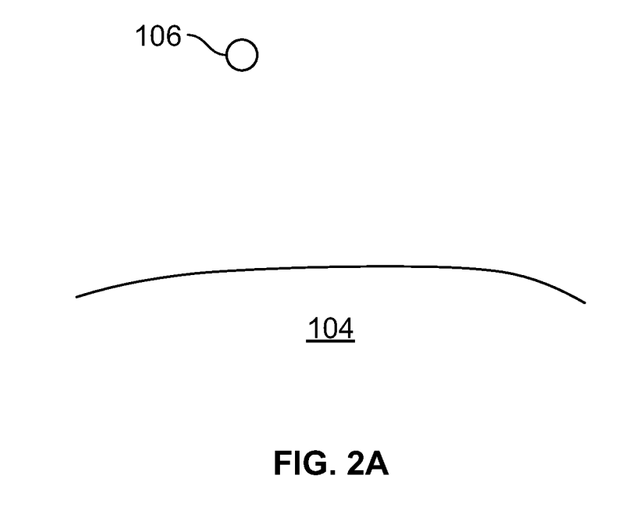
FIG. 2A illustrates an example embodiment, wherein a retroreflecting device is in geosynchronous orbit with the Earth.

Referring to FIG. 1 and FIG. 2A, FIG. 2A illustrates an example embodiment, wherein a retroreflecting device is in geosynchronous orbit with the Earth. As shown in the figure, retroreflecting device 106 is stationary relative to the surface of ground 104. This may be accomplished by use of a geosynchronous satellite. In these such embodiments, once electromagnetic beam broadcasting station 102 has fixed the location of retroreflecting device 106, electromagnetic beam broadcasting station 102 does not need to continuously or periodically track retroreflecting device 106 in order to transmit an electromagnetic beam.

Figure 2B:
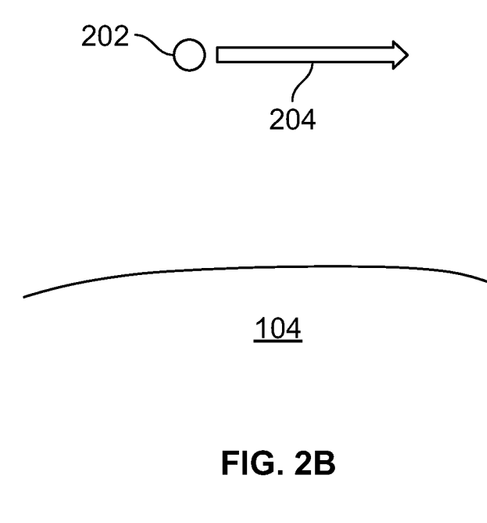
FIG. 2B illustrates an example embodiment, wherein a retroreflecting device is moving relative to the surface of the Earth.

Referring to FIG. 1 and FIG. 2B, FIG. 2B illustrates an example embodiment, wherein a retroreflecting device moving relative to the surface of the Earth. As shown in the figure, a retroreflecting device 202 is moving with a velocity indicated by arrow 204 relative to the surface of ground 104. This may be accomplished by use of any known manner, non-limiting examples of which include a non-geosynchronous satellite, a vehicle, a drone and ammunition. In these such embodiments, electromagnetic beam broadcasting station 102 would include a known tracking system or device to continuously or periodically track retroreflecting device 106 in order to transmit an electromagnetic beam.

Figure 3:
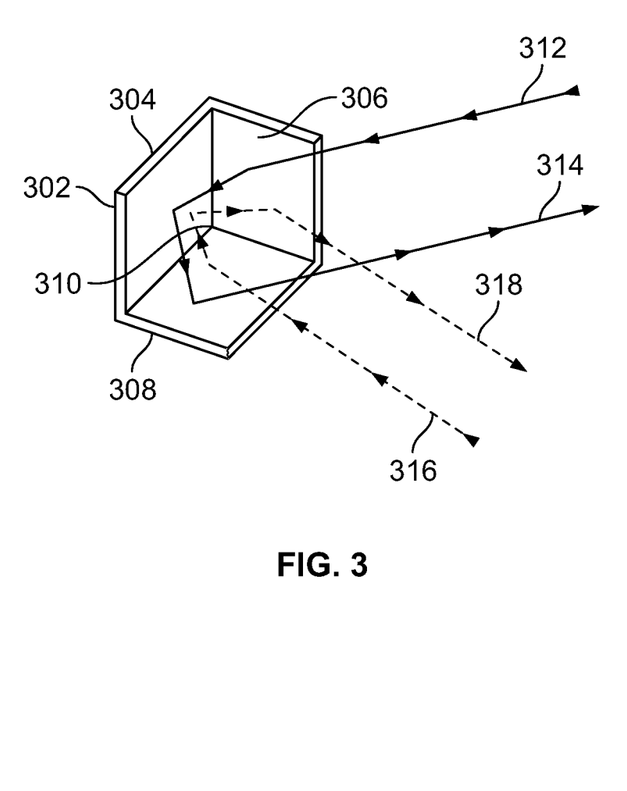
FIG. 3 illustrates an example of a corner cube retroreflector.

FIG. 3 illustrates an example of a corner cube retroreflector (CCR) 302.

As shown in the figure, CCR 302 includes three perpendicularly positioned reflecting surfaces. In particular, a surface 304, a surface 306 and a surface 308 are arranged perpendicularly so as to have a corner 310. The three reflecting surfaces are arranged to reflect an incoming ray in a parallel direction. For example, ray 312 strikes surface 306, is reflected toward surface 304, strikes surface 304, is reflected toward surface 310, strikes surface 310 and is reflected in a direction parallel to ray 312 as ray 314. Similarly, ray 316 strikes surface 310, is reflected toward surface 304, strikes surface 304, is reflected toward surface 306, strikes surface 306 and is reflected in a direction parallel to ray 316 as ray 318.

Figure 4:
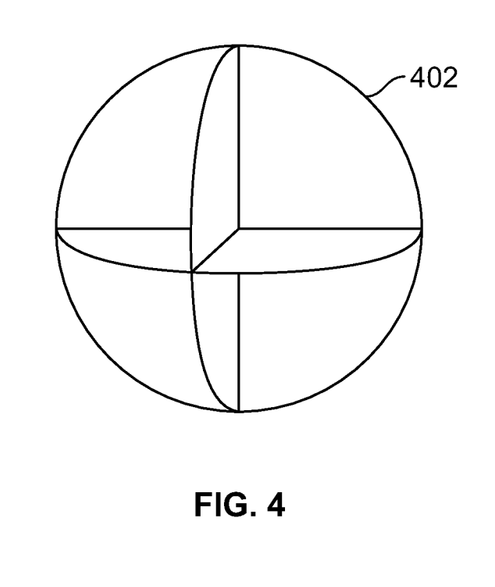
FIG. 4 illustrates the front half of an eight-corner spherical retroreflector.

FIG. 4 illustrates the front half of an eight-corner spherical retroreflector 402. Eight-corner spherical retroreflector 402 guarantees a corner cube reflection from any direction.

As mentioned above, an aspect of the present invention is drawn to providing the expensive, vulnerable, and maintenance-demanding components on the ground. As such the electromagnetic beam broadcasting station 102 will now be described with reference to FIG. 5.

Figure 5:
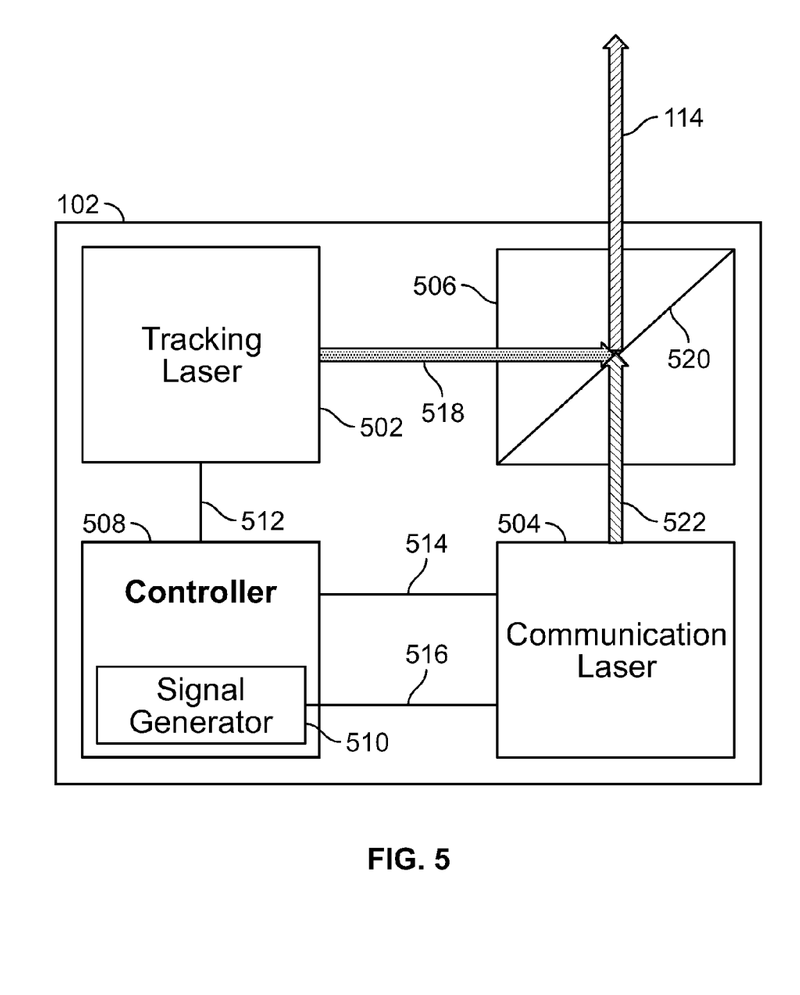
FIG. 5 illustrates an example of electromagnetic beam broadcasting station in accordance with aspects of the present invention.

FIG. 5 illustrates an example of electromagnetic beam broadcasting station 102 in accordance with aspects of the present invention.

As shown in the figure, electromagnetic beam broadcasting station 102 includes a tracking laser 502, a communication laser 504, a beam combiner 506 and a controller 508. Beam combiner 506 includes a combining surface 520. Controller 508 includes a signal generator 510.

Controller 508 controls tracking laser 502 via a communication channel 512 and controls communication laser 504 via a communication channel 514. Signal generator 510 provides a communication signal to communication laser 504 via a communication channel 516. Signal generator 510 may include an encoder to encode information to be transmitted in any known manner.

Tracking laser 502 generates a tracking laser beam 518 based on a control signal from controller 508. Communication laser 504 generates a communication laser beam 522 based on a control signal from controller 508 and as modulated by the communication signal from signal generator 510.

In this example embodiment, combining surface 520 of beam combiner 506 includes a series of optical interference layers that transmit communication laser beam 522 and that reflect tracking laser beam 518. In this manner divergent electromagnetic beam 114 is a combination of communication laser beam 522 and tracking laser beam 518. It should be noted that any known beam combining device or system may be used.

In some embodiments, communication laser beam 522 and tracking laser beam 518 are transmitted at the same time, but at different wavelengths, such as with wavelength division multiplexing.

In some embodiments, communication laser beam 522 and tracking laser beam 518 are transmitted at different times, such as with time division multiplexing.

A system in accordance with aspects of the present invention was simulated. The results of the simulation will be described with reference to FIGS. 6-7.

Figure 6:
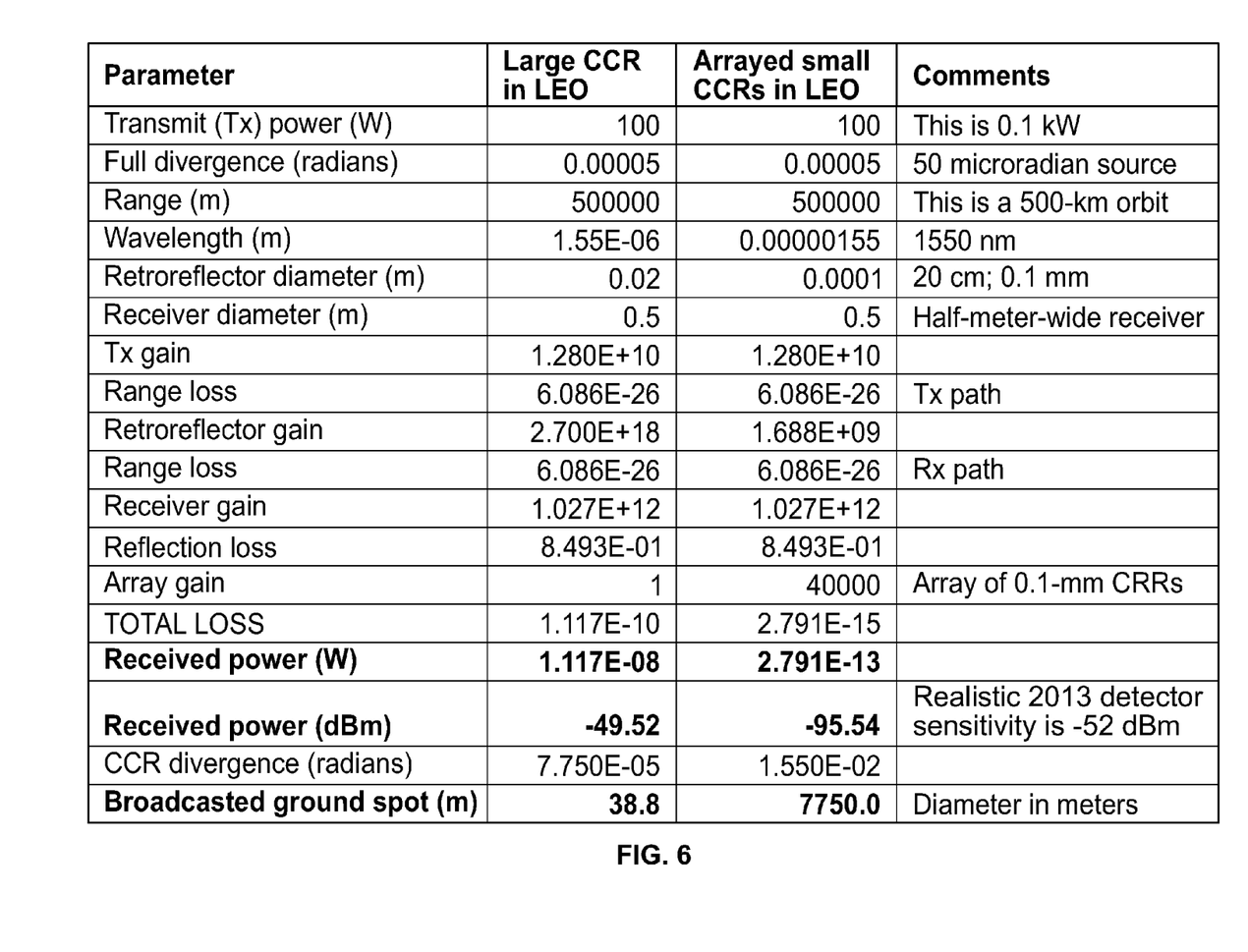
FIG. 6 illustrates a table of link budgets that provide received power and broadcast spot size for low Earth orbit satellites comprised of a single large-format CCR apparatus (left) and small-format arrayed CCRs (right)

FIG. 6 illustrates a table of link budgets that provide received power and broadcast spot size for low Earth orbit (LEO) satellites comprised of a single large-format CCR apparatus (left) and small-format arrayed CCRs (right).

Calculations can estimate the optical broadcast link performance. As a demonstration of feasibility, two link budgets as shown in FIG. 6 were calculated for equal-sized LEO satellites: one with a large-format CCR, for example as illustrated in FIG. 4, and one comprised of many sub-millimeter-scale CCRs (which possess inherently larger divergence). The simplified calculations assume ideal pointing and tracking by the transmitter, ideal CCR optical properties (performance only limited by diffraction), and no atmospheric turbulence or absorption. While many link budget parameters are equivalent, those related to the CCR properties are quite different, and dramatically affect the final beam characteristics.

The most noteworthy results are the received power and the broadcasted spot size. Using the lower-divergence large CCR yields a received power (in dBm) that is detectable by standard 2013 optical receivers, but the spot size is much smaller than desired, at only approximately 39 m. Using the small-format arrayed CCRs spreads the optical signal over an ideal distance—nearly 8 km—but the received power (in dBm) is several orders of magnitude smaller than what is required by 2013 optical detectors. A feasible link could be developed many ways, which include increasing the laser transmitter's power, implementing pulsed laser operation for higher, more detectable peak powers, reducing the ground spot size requirements, and improving the detector sensitivity or optics with advanced engineering techniques.

While the simplified link budgets of FIG. 6 neglect atmospheric effects, they must be factored into any functional system. These effects are multifactorial; however, an order-of-magnitude scaling of the overall atmospheric effect can be given in general.

Figure 7:
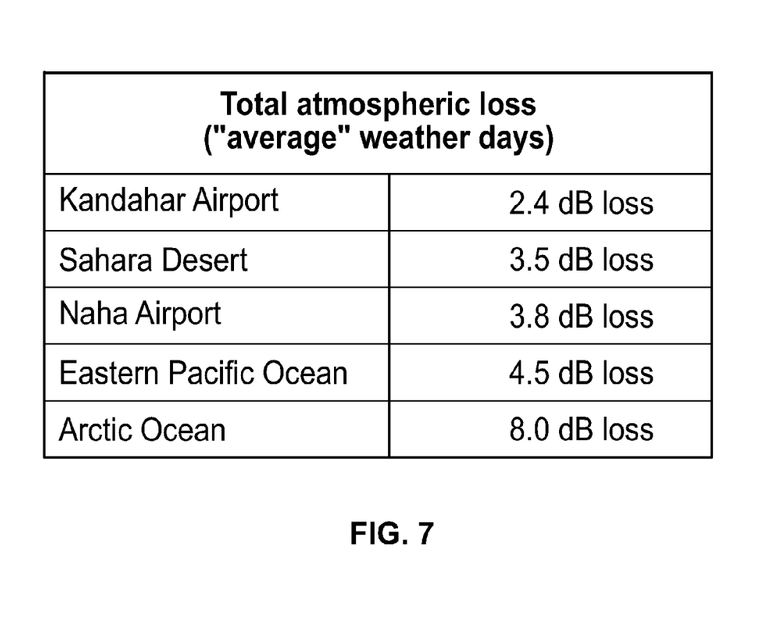
FIG. 7 illustrates a table of atmospheric loss for multiple global environments in a directly up and down optical link scenario.

FIG. 7 illustrates a table of atmospheric loss for multiple global environments in a directly up and down optical link scenario. The calculation assumes average weather, propagation to a satellite in LEO, and a laser transmitter with 1550-nm wavelength and 100-W power.

Using scaling-law simulation codes for optical beam propagation in a diverse set of environments (e.g., over-ocean, over-land, over-desert), the total loss from the atmosphere for a directly up and down propagation scenario will be on the order of 1 dB, or some multiplicative factor. These effects, as shown in FIG. 7, can be incorporated into the link budgets for this scenario or for similar performance analyses. The calculations show a median loss of around 3 dB, or approximately 50%—a modest value. Thus, atmospheric effects do not appear to significantly impact the feasibility of optical broadcasting.

As for the receiving stations, any known device or system that is operable to receive the electromagnetic beam as transmitted by broadcasting station 102 may be used. Operation of an example receiving station in accordance with aspects of the present invention will now be described with additional reference to FIG. 8.

Figure 8:
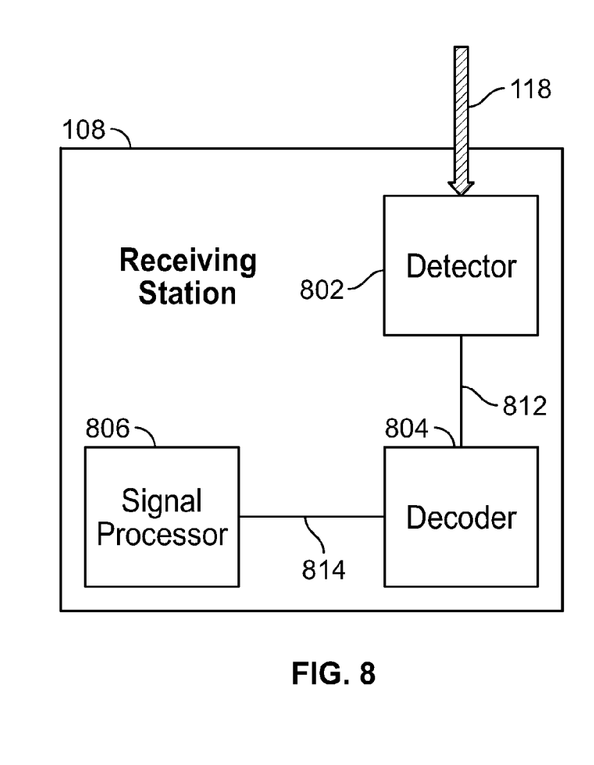
FIG. 8 illustrates an exploded view of an example receiving station.

FIG. 8 illustrates an exploded view of receiving station 108.

As shown in the figure, receiving station 108 includes a detector 802, a decoder 804 and a signal processor 806.

Detector 802 is arranged to receive reflected divergent electromagnetic beam 118. As discussed above with reference to FIG. 5, divergent electromagnetic beam 114 includes tracking laser beam 518 and communication laser beam 522. As such, reflected divergent electromagnetic beam 118 will additionally include tracking laser beam 518 and communication laser beam 522. However, only communication laser beam 522 includes the information as generated by signal generator 510. Therefore, in the case where tracking laser beam 518 and communication laser beam 522 are time division multiplexed, detector 802 will correspondingly demultiplex reflected divergent electromagnetic beam 118 to obtain the portion corresponding to communication laser beam 522. Similarly, in the case where tracking laser beam 518 and communication laser beam 522 are wavelength division multiplexed, detector 802 will filter reflected divergent electromagnetic beam 118 to obtain the portion corresponding to communication laser beam 522. Detector 802 then provides an electrical signal corresponding to the received portion of communication laser beam 522 to decoder 804 via a communication channel 812.

Decoder 804 decodes the electrical signal provided by detector 802 in a manner corresponding to an encoding of the information as generated by signal generator 510. Decoder 804 provides the decoded signal to signal processor 806 via a communication channel 814.

Signal processor 806 further processes the decoded signal as needed. Further processing may include filtering and amplifying.

The example embodiment discussed above with reference to FIG. 5 includes a situation wherein an electromagnetic beam broadcasting station broadcasts a single broadcast from a single laser. For example, returning to FIG. 1, electromagnetic beam broadcasting station 102 may broadcast a single beam broadcast to each of receiving stations 108, 102 and 112, without broadcasting to receiving station 113. However, in other embodiments, electromagnetic beam broadcasting station may provide multiple broadcasts. This will be described with reference to FIGS. 9-10.

Figure 9:
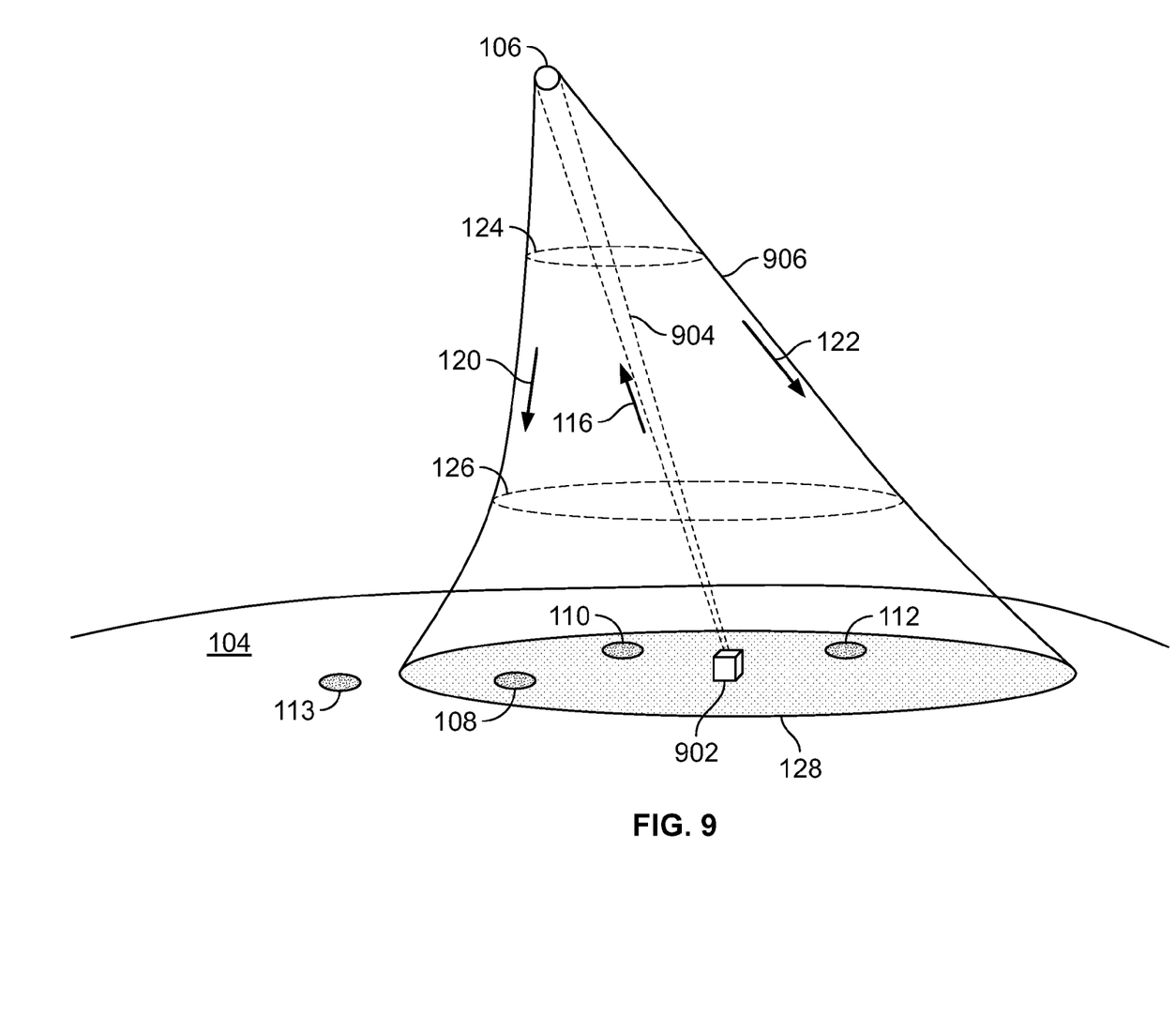
FIG. 9 illustrates another line-of-sight electromagnetic beam broadcasting system in accordance with aspects of the present invention.

FIG. 9 illustrates another line-of-sight electromagnetic beam broadcasting system in accordance with aspects of the present invention.

The system of FIG. 9 differs from the system discussed above with reference to FIG. 1, in that electromagnetic beam broadcasting station 102 is replaced with an electromagnetic beam broadcasting station 902.

Electromagnetic beam broadcasting station 902 transmits a divergent electromagnetic beam 904 in a direction indicated by arrow 116 toward retroreflecting device 106. Retroreflecting device 106 then reflects divergent electromagnetic beam 904 as a reflected divergent electromagnetic beam 906 in a direction indicated by arrows 122 and 120 toward electromagnetic beam broadcasting station 902.

Figure 10:
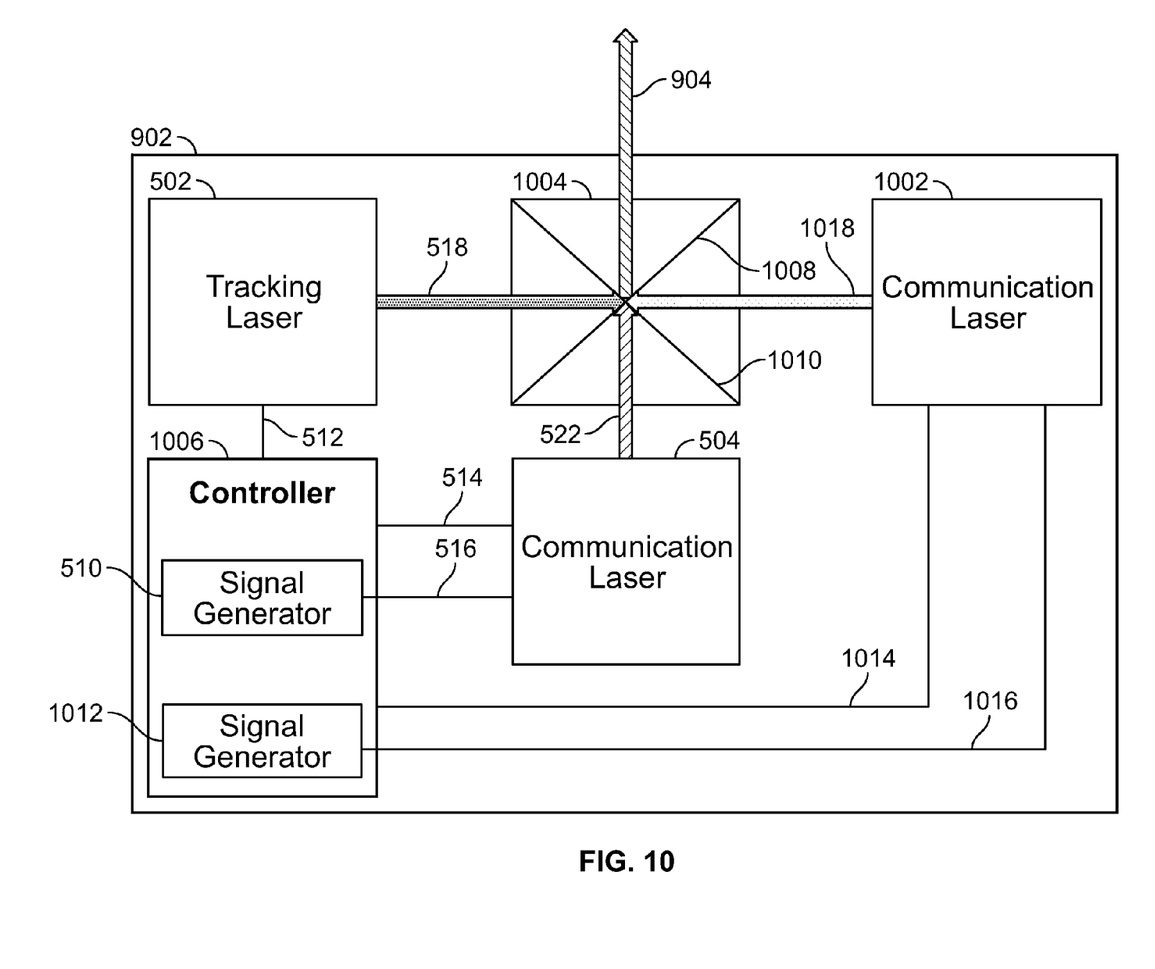
FIG. 10 illustrates an example of an electromagnetic beam broadcasting station in accordance with aspects of the present invention.

FIG. 10 illustrates an example of an electromagnetic beam broadcasting station 902 in accordance with aspects of the present invention.

As shown in the figure, electromagnetic beam broadcasting station 902 includes tracking laser 502, communication laser 504, a communication laser 1002, a beam combiner 1004 and a controller 1006. Beam combiner 1004 includes a combining surface 1008 and a combining surface 1010. Controller 508 includes signal generator 510 and a signal generator 1012. Like elements between electromagnetic beam broadcasting station 108 discussed above with reference to FIG. 5 and electromagnetic beam broadcasting station 902 will not be discussed again for brevity.

Controller 1006 controls tracking laser 502 via a communication channel 512, controls communication laser 504 via communication channel 514 and controls communication laser 1002 via a communication channel 1014. Signal generator 1012 provides a communication signal to communication laser 1002 via a communication channel 1016. Signal generator 1012 may include an encoder to encode information to be transmitted in any known manner.

Communication laser 1002 generates a communication laser beam 1018 based on a control signal from controller 1006 and as modulated by the communication signal from signal generator 1012.

In this example embodiment, combining surface 1008 of beam combiner 1004 includes a series of optical interference layers that transmit communication laser beam 522, that reflect tracking laser beam 518 and transmit communication laser beam 1018. Further, combining surface 1010 of beam combiner 1004 includes a series of optical interference layers that transmit communication laser beam 522, that transmit tracking laser beam 518 and that reflect communication laser beam 1018. In this manner divergent electromagnetic beam 904 is a combination of communication laser beam 522, communication laser beam 1018 and tracking laser beam 518. It should be noted that any known beam combining device or system may be used.

In some embodiments, communication laser beam 522, communication laser beam 1018 and tracking laser beam 518 are transmitted at the same time, but at different wavelengths, such as with wavelength division multiplexing. In some embodiments, communication laser beam 522, communication laser beam 1018 and tracking laser beam 518 are transmitted at different times, such as with time division multiplexing. In some embodiments, communication laser beam 522, communication laser beam 1018 are encoded with different encoding schemes.

Returning to FIG. 9, for purposes of discussion, let receiving station 108 and receiving station 112 be configured to receive information on communication laser beam 522 and let receiving station 110 be configured to receive information on communication laser beam 1018. In this manner, receiving stations 108, 110 and 112 will all receive reflected divergent electromagnetic beam 906.

Divergent electromagnetic beam 904, and thus reflected divergent electromagnetic beam 906, are multiplexed or encoded as mutually exclusive combinations of communication laser beam 522 and communication laser beam 1018. As such, receiving station 108 and receiving station 112 will receive information on communication laser beam 522, whereas receiving station 110 will receive information on communication laser beam 1018.

In the above discussed embodiment of FIGS. 9-10, only two distinct communication lasers are employed. This is a non-limiting example used for purposes of illustration. It should be noted that any number of lasers may be used to enable an equal number of communication channels for communication by way of an electromagnetic beam.

The retroreflector employed for optical broadcasting can take alternate forms. Instead of a flat-mirror-based CCR, a clear, robust, solid sphere can be used to reflect the optical beam. Light transmitted through the clear, front half of the sphere is focused to the metal-coated backside of the sphere, where it reflects back in the direction from which it originated. On average, the retroreflector will only function 50% of the time, as the coated surface of the sphere must point away from the transmitter during operation, but this limitation may be sufficient for certain applications. One such passive satellite, which was named BLITS (Ball Lens In The Space), has been placed in orbit, but it never demonstrated optical broadcasting.

As an alternative to the retroreflector entirely, a single mirror with slight curvature can be used to reflect the broadcasted signal. This reflector would be best suited to airborne platforms, as its divergence would be much larger than that from CCRs. For very short broadcasting distances (on the order of one kilometer or less), the curved mirror may even be placed at the top of an existing tall tower (used, for example, in radio communications) or a mobile tower (extended from a truck platform, for example).

An alternative use of near-infrared broadcasting arises at night: enhanced visualization by infrared night imaging systems is enabled when illuminating the retroreflector with such light. While invisible to the naked eye, IR sensors would observe increased brightness and contrast of objects of interest within the broadcast spot. This feature would have utility for military, search-and-rescue, and security applications.

Unlike RF communications, optical communications are very difficult to jam because the adversary needs to be in the footprint of the beam (or field of view of the receiver) to send a stronger optical signal. The inventive feature of using a beam, as opposed to a spherical transmission of electromagnetic radiation as associated with antennas, drastically limits the opportunity for unwanted receivers to intercept the information. The notion of a space-based or airborne optical relay has been around for some time, but the new concept of using a passive retroreflector greatly reduces costs and accelerates the ability to update the laser transmitter system, which remains on the ground.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A system comprising:
   a tracking electromagnetic beam generator operable to transmit a tracking electromagnetic beam;
   a retro-reflecting device operable to reflect the tracking electromagnetic beam toward said tracking electromagnetic beam generator;
   a signal generator operable to generate a communication signal;
   a communication electromagnetic beam generator operable to transmit a communication electromagnetic beam, based on the communication signal, to said retro-reflecting device; and
   a receiver operable to receive a portion of the communication electromagnetic beam as reflected from said retro-reflecting device.

2. The system of claim 1, wherein said communication electromagnetic beam generator comprises a laser operable to transmit the communication electromagnetic beam as a laser beam including a wavelength of 1550 nm.

3. The system of claim 1, wherein said communication electromagnetic beam generator comprises a laser operable to transmit the communication electromagnetic beam as a laser beam including a wavelength within a wavelength band of 200 nm-10600 nm.

4. The system of claim 1, further comprising:
   a second communication electromagnetic beam generator operable to transmit a second communication electromagnetic beam,
   wherein the communication electromagnetic beam and the second communication electromagnetic beam have different wavelengths.

5. The system of claim 1, further comprising:
   a second communication electromagnetic beam generator operable to transmit a second communication electromagnetic beam,
   wherein the communication electromagnetic beam and the second communication electromagnetic beam have different encoding schemes.

6. The system of claim 1, wherein said retro-reflecting device comprises an eight-corner spherical retroreflector.

7. The system of claim 1, wherein said retro-reflecting device comprises an array of corner cube retro-reflectors.

8. The system of claim 1, wherein said retro-reflecting device comprises a curved mirror.

9. The system of claim 1, wherein said retro-reflecting device comprises a mirror and a lens.

10. A method comprising:
    transmitting, via a tracking electromagnetic beam generator, a tracking electromagnetic beam;
    reflecting, via a retro-reflecting device, the tracking electromagnetic beam toward the tracking electromagnetic beam generator;
    generating, via a signal generator, a communication signal;
    transmitting, via a communication electromagnetic beam generator, a communication electromagnetic beam, based on the communication signal, to the retro-reflecting device; and
    receiving, via a receiver, a portion of the communication electromagnetic beam as reflected from the retro-reflecting device.

11. The method of claim 10, wherein said transmitting, via a communication electromagnetic beam generator, a communication electromagnetic beam comprises transmitting, via a communication laser, the communication electromagnetic beam as a laser beam including a wavelength of 1550 nm.

12. The method of claim 10, wherein said transmitting, via a communication electromagnetic beam generator, a communication electromagnetic beam comprises transmitting, via a communication laser, the communication electromagnetic beam as a laser beam including a wavelength within a wavelength band of 400-550 nm.

13. The method of claim 10, further comprising:
    transmitting, via a second communication electromagnetic beam generator, a second communication electromagnetic beam,
    wherein the communication electromagnetic beam and the second communication electromagnetic beam have different wavelengths.

14. The method of claim 10, further comprising:
    transmitting, via a second communication electromagnetic beam generator, a second communication electromagnetic beam,
    wherein the communication electromagnetic beam and the second communication electromagnetic beam have different encoding schemes.

15. The method of claim 10, wherein said reflecting, via a retro-reflecting device, the tracking electromagnetic beam toward the tracking electromagnetic beam generator comprises reflecting via an eight-corner spherical retroreflector.

16. The method of claim 10, wherein said reflecting, via a retro-reflecting device, the tracking electromagnetic beam toward the tracking electromagnetic beam generator comprises reflecting via an array of corner cube retro-reflectors.

17. The method of claim 10, wherein said reflecting, via a retro-reflecting device, the tracking electromagnetic beam toward the tracking electromagnetic beam generator comprises reflecting via a curved mirror.

18. The method of claim 10, wherein said reflecting, via a retro-reflecting device, the tracking electromagnetic beam toward the tracking electromagnetic beam generator comprises reflecting via a mirror and a lens.

19. A method comprising:
   transmitting, via a tracking electromagnetic beam generator, a tracking electromagnetic beam;
   reflecting, via a retro-reflecting device, the tracking electromagnetic beam toward the tracking electromagnetic beam generator;
   generating, via a signal generator, a communication signal;
   encoding, via an encoder, the communication signal to generate an encoded signal;
   transmitting, via a communication electromagnetic beam generator, a communication electromagnetic beam, based on the communication signal, to the retro-reflecting device;
   receiving, via a receiver, a portion of the communication electromagnetic beam as reflected from the retro-reflecting device to generate a received signal; and
   decoding, via a decoder, the received signal.

20. The method of claim 19, wherein said reflecting, via a retro-reflecting device, the tracking electromagnetic beam toward the tracking electromagnetic beam generator comprises reflecting via an eight-corner spherical retroreflector.

* * * * *